United States Patent [19]

Shinozaki et al.

[11] Patent Number: 4,529,336

[45] Date of Patent: Jul. 16, 1985

[54] METHOD OF DISTRIBUTING AND TRANSPORTING POWDERED OR GRANULAR MATERIAL

[75] Inventors: Yoshinobu Shinozaki, Yokohama; Motozo Yasuno, Ichihara; Tadaaki Iwamura, Chiba; Hironari Marushima, Mobara; Yoshiteru Tagawa, Ichihara; Ryoji Takabe, Chiba; Takashi Moriyama, Tokyo; Shuzo Fujii, Tokyo; Keiichi Achiba, Tokyo; Hideo Oishi, Tokyo; Yasuo Yanagihara, Tokyo; Yoshiaki Masuda, Tokyo, all of Japan

[73] Assignees: Kawasaki Steel Corporation, Hyogo; Denka Consultant & Engineering Co., Ltd., Tokyo, both of Japan

[21] Appl. No.: 482,638

[22] Filed: Apr. 6, 1983

[30] Foreign Application Priority Data

Dec. 27, 1982 [JP] Japan ................. 57-233005

[51] Int. Cl.³ .............................. B65G 53/66
[52] U.S. Cl. .............................. 406/14; 222/1; 406/124; 406/24; 406/93; 406/123
[58] Field of Search ............. 406/123, 124, 93–95, 406/24, 25, 14; 222/1

[56] References Cited

U.S. PATENT DOCUMENTS 3,230,016 1/1966 Gilbert et al. ................. 406/124
3,720,351 3/1973 Coulter et al. ................. 222/1

Primary Examiner—Jeffrey V. Nase
Assistant Examiner—L. E. Williams
Attorney, Agent, or Firm—Koda and Androlia

[57] ABSTRACT

A method of distributing powdered or granular material to a plurality of feeding ends in a system having a pressurizing tank for pressurizing and fluidizing a powdered or granular material, a plurality of transportation pipes having one ends constituting discharge nozzles opening above a fluidized bed in the tank and the other ends connected to different feeding ends so as to introduce the material to the feeding ends, and a plurality of booster gas supply pipes for supplying respective transportation pipes with a booster gas. The internal pressure of the tank is controlled by a controller provided with a set valve in accordance with the mean value of the terminal pressures at the feeding ends, the mean value of predetermined set flow rates of the booster gas in the booster gas supplying pipes, and the mean value of predetermined set rates of transportation of material to the feeding ends.

8 Claims, 3 Drawing Figures

METHOD OF DISTRIBUTING AND TRANSPORTING POWDERED OR GRANULAR MATERIAL

BACKGROUND OF THE INVENTION

1. Field of the Invention

The present invention relates to a method of distributing and transporting powdered or granular material such as pulverized coal, refining agent or the like from a pressurizing tank for transportation to a plurality of feeding ends such as tuyeres of a blast furnace. More particularly, the invention is concerned with a method of distributing and transporting powdered particles or granular material in which the material is distributed and transported from a single transportation pressurizing tank to a plurality of feeding ends through respective transportation pipes connected to the pressurizing tank at discharging rates which are determined beforehand for respective transportation pipes, without necessitating any specific distributing device.

2. Prior Art

A typical known system for continuously supplying a material to a plurality of feeding ends is shown in, for example, Japanese Patent Publication No. 29684/1976 corresponding to U.S. Pat. No. 3,720,351 and German Pat. No. 2,243,439. In this known system, two or more batch tanks arranged in parallel are used alternatingly or one after another to deliver the material to the tuyeres through a specific distributor. This known system, however, employs a large amount of equipment which in turn occupies an impractically large installation area and necessitates a complicated piping arrangement. In addition, there is a fatal disadvantage of being unable to control the discharging rates of material through respective transportation pipes independently.

U.S. Pat. No. 3,230,016 discloses, by way of example, a series type distributing and transporting apparatus having a lower chamber which accomodates a distributor constituted of an inversed-conical hopper consisting of a pair of cones to which transportation pipes are connected independently. In this apparatus, therefore, the construction of the tank is impractically complicated. In addition, since the material is moved downwardly in the tank, it is necessary that discharge nozzles have a comparatively small diameter, in order to prevent intermittent floodability which is often experienced when the handled material has a strong adhesion as generally shown by material having small particle sizes. The reduced diameter of the nozzle inevitably increases the tendency of plugging in the nozzle. Thus, the prevention of floodability and prevention of plugging of the nozzle are generally incompatible with each other. This apparatus, therefore, cannot be used suitably for the transportation of powdered or granular materials exhibiting inferior transportation characteristics and cannot apply to a large variety of physical properties of the powdered or granular material.

Under this circumstance, the present applicant has filed a Patent application on an invention entitled "Method of and Apparatus for Distributing Powdered Particles" (filed May 3, 1982, Ser. No. 374,313). The invention of this application employs a pressurizing tank provided with a weighing device, and a plurality of transportation pipes which open at their one ends to the fluidized bed in the tank and connected at their other ends to different feeding ends. In operation, the powdered granular material is directly distributed and transported from the pressurizing tank to the feeding ends through the transportation pipes. During the transporting operation, the velocity of a gas through the fluidized bed is controlled and maintained substantially at a constant valve by a pressure regulating signal determined by a first factor which is a rate of change in the weight of the tank including the weight of the material contained by the tank and a secondary factor which is the internal pressure of the tank, and the flow rates of booster gas supplied to respective transportation pipes are controlled independently to attain desired flow rates of the powdered or granular material in the transportation pipes. The control of the flow rate of the booster gas in each transportation pipe is made by means of a differential pressure signal corresponding to the differential pressure across the discharge nozzle of each transportation pipe. The distribution and transportation apparatus of the type described permits distribution and transportation of the powdered or granular material to the feeding ends at desired flow rates very well. In order to achieve higher accuracy in the distribution and transportation of the powdered or granular material, however, it is necessary to employ a more practical way of control. For instance, although the control of the flow rate of the booster gas in each transportation pipe is achieved in accordance with the differential pressure across the discharge nozzle, it is necessary to take into account the difference between the mass flow rate of the powdered or granular material in each transportation pipe attained through the above-mentioned control and the actual mass flow rate of the powdered or granular material in each transportation pipe, in order to achieve higher accuracy of the distribution and transportation.

SUMMARY OF THE INVENTION

Accordingly, an object of the invention is to improve the method of directly distributing and transporting powdered or granular material proposed in the patent application mentioned before, thereby to attain a higher accuracy of distribution and transportation of the powdered or granular material.

To this end, according to an aspect of the invention, there is provided a method of directly distributing and transporting a powdered or granular material to feeding ends in a system having a pressurizing tank provided with a weighing device and adapted for pressurizing and fluidizing a powdered or granular material, a plurality of transportation pipes having one ends constituting discharge nozzles opening above the fluidized bed in the tank and the other ends connected to different feeding ends so as to introduce the material to the feeding ends, and a plurality of booster gas supply pipes for supplying respective transportation pipes with a booster gas, the method comprising the step of determining the set value of the pressure in the pressurizing tank taking into account the mean value of the pressures at the feeding ends, the mean value of predetermined set flow rates of the booster gas in the booster gas supplying pipes, and the mean value of the predetermined rates of transportation of material to the feeding ends.

According to another aspect of the invention, the method comprises the steps of: calculating the sum of predetermined set rates of material transportation to the feeding ends, and delivering a signal representing the sum as a set value to a material discharging rate controller; calculating the actual discharging rate of the material from the pressurizing tank by calculating the rate of change of weight of the pressurizing tank by the weighing device, and delivering a signal representing the actual discharging rate to the discharging rate controller; and determining a set value in a tank internal pressure controller in accordance with the output signal from the discharging rate controller.

According to still another aspect of the invention, the method comprises the steps of: determining set values of pressure differentials across the discharging nozzles of the transportation pipes in accordance with predetermined rates of transportation of the material to the feeding ends; delivering the set values of the pressure differentials to pressure differential controllers together with signals representing actually measured pressure differentials across the discharging nozzles; and determining, in accordance with the output signals from the pressure differential controllers, set values in booster gas flow rate controllers for controlling the rates of supply of the booster gases to respective transportation pipes.

Other objects, features and advantages of the invention will become clear from the following description of the preferred embodiment taken in conjunction with the accompanying drawings.

DESCRIPTION OF THE PREFERRED EMBODIMENT

The invention will be fully described hereinunder with reference to the accompanying drawings.

Figure 1:
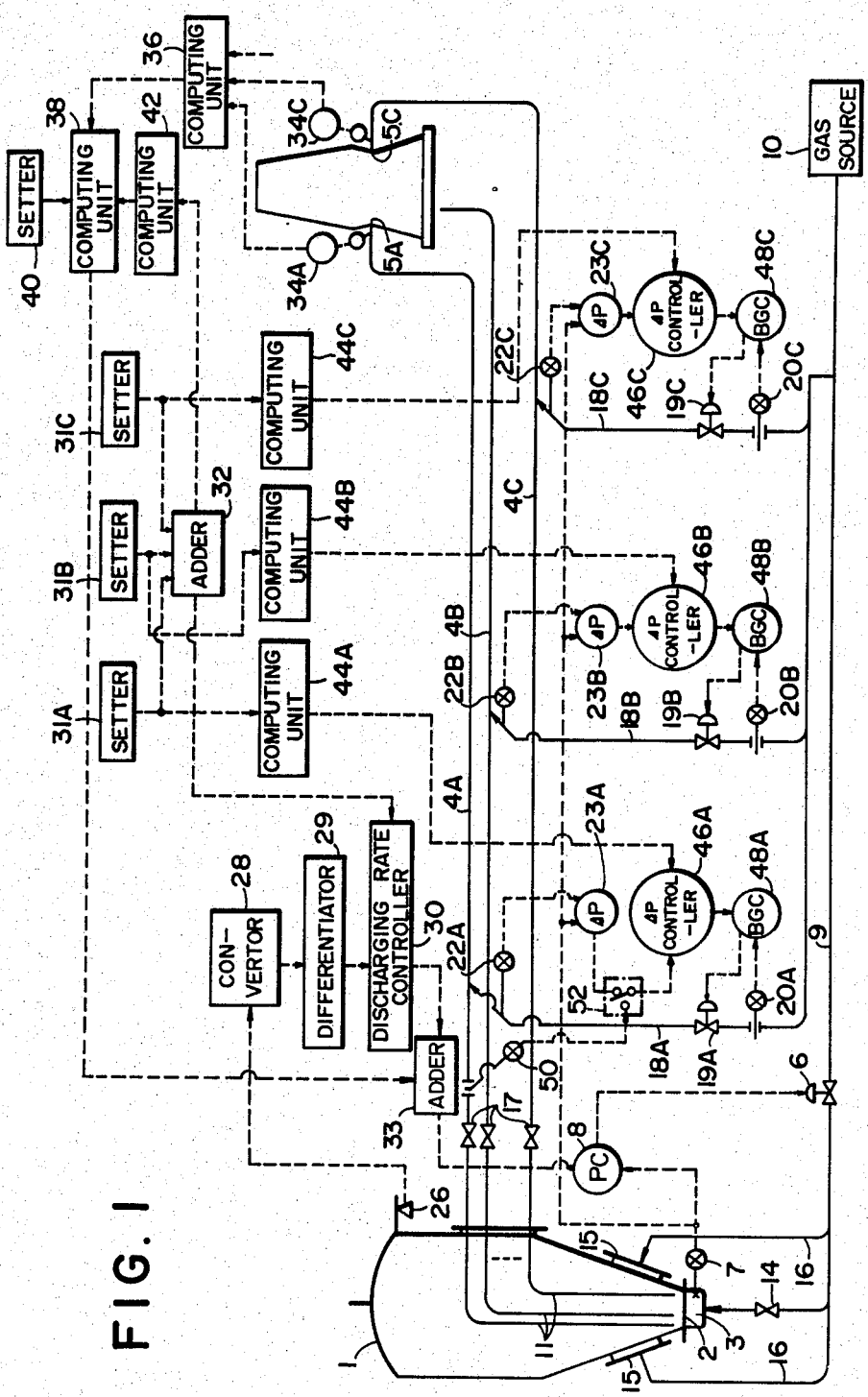
FIG. 1 is a control circuit diagram showing an embodiment of a method of distributing and transporting powdered or granular material in accordance with the invention.

Referring first to FIG. 1, a method of the invention for distributing and transporting powdered or granular material employs a transportation pressurizing tank 1 which is supplied with powdered or granular material through a hopper and a supply tank which are not shown. The pressurizing tank 1 is provided at its lower end with a pressure chamber 3 which is held in communication with a source 10 of the pressurizing gas through a pressurizing line 9. The arrangement is such that the powdered or granular material supplied onto a fluidized bed 2 above the pressure chamber 3 is fluidized and pressurized by the pressurized gas coming from the source 10 of the pressurized gas. A shut-off valve 14 is provided in the pressurized gas line branching from the above-mentioned pressurizing line 9 and leading to the pressure chamber 3. The pressure in the pressure chamber 3 is controlled by a pressure control valve 6 provided in the pressurizing line 9, in a manner which will be explained later. Aerators 15 are provided on a tapered peripheral wall of the transportation pressurizing tank. These aerators 15 receive the pressurized gas through lines 16 branching from the pressurizing line 9 thereby to prevent bridge formation of the powdered or granular material in the tank 9 which may for otherwise take place in the tank. A plurality of transportation pipes 4A to 4C extending into the transportation pressurizing tank 1 have discharge nozzles 11 opposing to the fluidized bed 2 in the transportation pressurizing tank 1. Although only three transportation pipes are shown, this number of the pipes is not exclusive and may be increased in accordance with the number of the feeding ends which will be explained later. The transportation pipes 4A to 4C are provided at their intermediate portions with shut-off valves 17 and are connected at their outer ends to respective feeding ends which are, in this case, tuyeres 5A to 5C (only two 5A and 5C of them are shown) of, for example, a blast furnace. Therefore, the fluidized and pressurized powdered or granular material on the fluidized bed 2 is directly distributed and transported to the tuyeres 5A to 5C through respective transportation pipes 4A to 4C.

Booster gas supplying pipes 18A to 18C, which branch from the pressurizing line 9, are connected to the portions of the transportation pipes 4A to 4C downstream from the shut-off valves 17. The booster gas supplying pipes 18A to 18C are provided with flow rate detectors 20A to 20C and flow-rate control valves 19A to 19C which adjust the flow rates of the booster gas in respective booster gas supplying pipes 18A to 18C in a manner which will be explained later.

An explanation will be made hereinunder as to how the distribution and transportation of the powdered or granular material is controlled.

A weighing device 26 annexted to the transportation pressurizing tank 1 weighs the weight of the latter. The weight is then converted into an electric signal by a converter 28 and is then delivered to a differentiator 29 which calculates the rate a change of weight of the transportation pressurizing tank 1, i.e. the actual discharging rate of the powdered or granular material from the pressurizing tank 1. The output from the differentiator 29 is delivered to a discharging rate controller 30.

Material flow rate setting devices 31A,31B and 31C are to produce flow rate setting signals to set beforehand the flow rates of the powdered or granular material in respective transportation pipes. The material flow rate setting signals produced by the setting devices 31A,31B and 31C are delivered to a summing adder 32 which calculate the sum of the material flow rate setting signals to determine a set value of the total flow rate, i.e. the total discharging rate, of the powdered or granular material transported through the transportation pipes. The output from the adder 32 is delivered to the discharging rate controller 30 which compares the actual discharging rate mentioned before with the total set value of the discharging rate. An output signal from the controller 30 is delivered to a later-mentioned adder 33, the output of which is delivered as a set valve for the pressere in the tank to a pressure controller 8 attached to the pressurizing tank. The pressure controller 8 receives also a signal from a pressure detector 7 which detects the internal pressure of the pressurizing tank 1, particularly the pressure in the chamber 3. The pressure controller 8 produces a controlling output in accordance with which the pressure control valve 6 is controlled.

Terminal pressures, i.e. the pressures at the tuyeres 5A,5B and 5C as the feeding ends, are detected by pressure detectors 34A,34B and 34C. The signals from these pressure detectors, representing the pressures at the feeding ends, are delivered to a terminal pressure computing unit 36 which computes the mean value $P_2$ of the terminal pressures. The mean value $P_2$ of the pressure is delivered to a computing unit 38 which determines the optimum set value of the internal pressure of the pressurizing tank. A setting device 40 sets beforehand the mean value $Q_B$ of the flow rates of the booster gas introduced to the transportation pipes 4A,4B and 4C. The output from the setting device 40, i.e. the mean value $Q_B$, is delivered to the computing unit 38 mentioned above. The computing unit 38 receives also a signal from a material flow rate computing unit 42, representing the mean value dw/dt of the predetermined set values of flow rates of the powdered or granular material in respective transportation pipes 4A,4B and 4C. More specifically, the material flow rate computing unit 42 is connected to the summing adder 32 mentioned before so as to receive from the latter a signal representing the total transportation rate of the material, and calculates the mean value dw/dt which is delivered to the computing unit 38.

Figure 2:
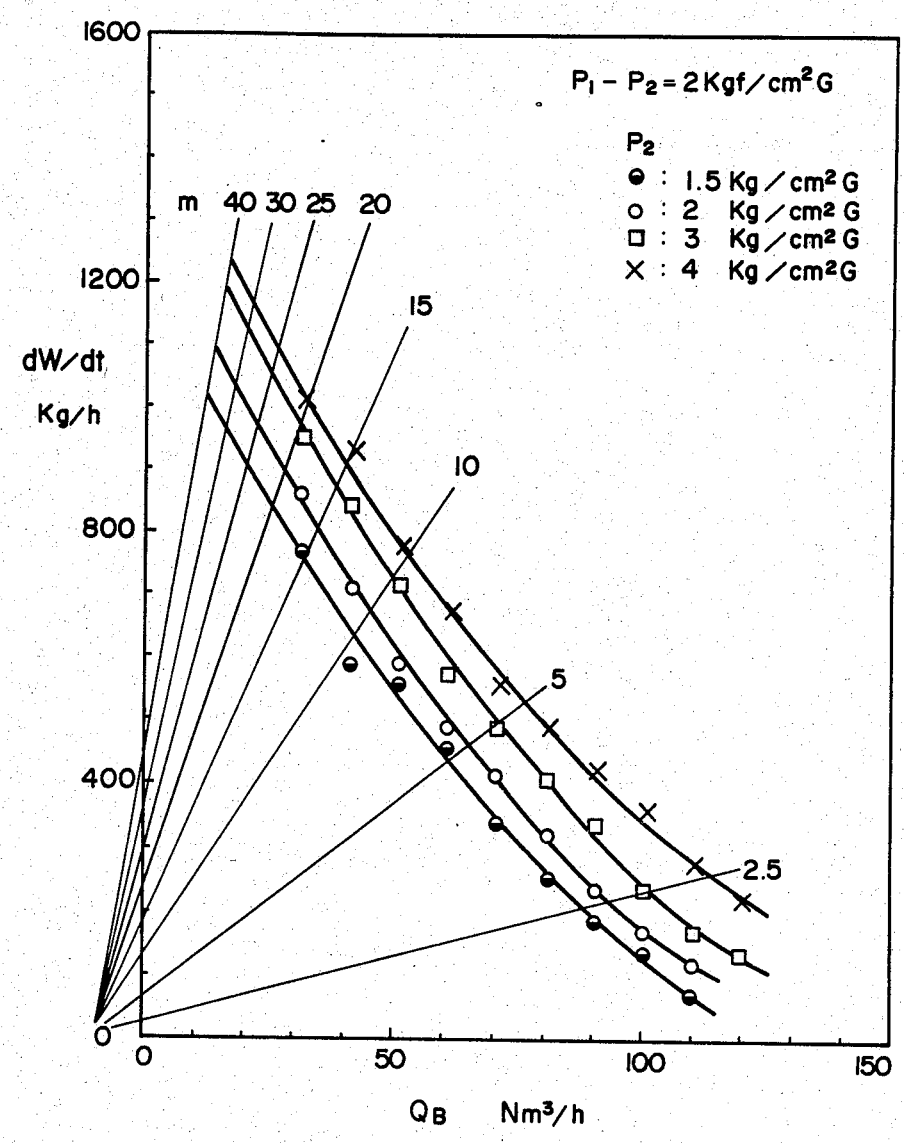
FIG. 2 is a graph showing the content of the computation performed by a computing unit employed in the embodiment shown in FIG. 1.

An explanation will be made hereinunder as to the content of the computation performed by the computing unit 38 with specific reference to FIG. 2, which shows the relationship between the transportation rate of the material dw/dt and the booster gas flow rate $Q_B$ as obtained when the pressure difference between the pressure $P_1$ in the pressurizing tank and the terminal pressure $P_2$ is maintained constantly at 2 Kgf/cm², while the terminal pressure $P_2$ is varied as 1.5, 2.0, 3.0 and 4.0 Kgf/cm²G. In this Figure, a symbol m represents a solid-gas ratio.

The relationship shown in this Figure can be expressed by the following formula (1).

$$(dw/dt) = -AQ_B^2 + BQ_B + CP_1 + D(P_1 - P_2) + E \qquad (1)$$

where, A,B,C,D and E represent positive constants which are, however, variable in accordance with the change in the pressure difference $P_1 - P_2$. Therefore, the curves in FIG. 2 will be gradually shifted as the pressure difference $P_1 - P_2$ is changed and, accordingly, these variable constants are stored in the computing unit as a constant table. Thus, the relationship expressed by the formula (1) is obtained regardless of the change in the pressure difference $P_1 - P_2$. It is, therefore, possible to determine the pressure $P_1$ by substituting definite values for dw/dt, $Q_B$ and $P_2$ in the formula (1). The terminal pressure $P_2$, flow rate $Q_B$ of the booster gas and the material transportation rate dw/dt vary depending on different transportation pipes. Therefore, mean values of these factors are determined and delivered to the computing unit 38 to obtain an optimum set value of the pressure $P_1$. The pressure setting signal representing the thus obtained set pressure $P_1$ is delivered through the adder 33 to the pressure controller 8. Namely, the pressure control valve 6 in the pressurizing line 9 is controlled also by the output from the computing unit 38.

Thus, the adder 33 receives the outputs from both computing units 30 and 38, and the pressure control valve 6 in the pressurizing line 9 is controlled in accordance with the adding calculation performed by the adder 33. In consequence, the pressure in the pressurizing tank is controlled in accordance with a suitable tank internal pressure setting signal which is changed in accordance with the change in the terminal pressures and, at the same time, the tank internal pressure setting signal is corrected by a control set signal which is produced through a comparison between the sum of the predetermined rates of material transported to all feeding ends and the actual discharging rate of the material from the pressurizing tank. It will be understood by those skilled in the art that the tank internal pressure setting signal controls the internal pressure of the pressurizing tank well by compensating for any change in the terminal pressures caused by, for example, pressure change operation of the blast furnace, while the control setting signal effectively corrects the internal pressure of the pressurizing tank in accordance with the actual discharging rate of the material from the pressurizing tank.

The set signals which are beforehand set in the material transportation rate setting devices 31A, 31B and 31C for respective transportation pipes are inputted to nozzle differential pressure computing units 44A,44B and 44C, respectively. The computing units 44A,44B and 44C calculate optimum pressure differences across discharge nozzles of the transportation pipes corresponding to the rates of material transportation through respective transportation pipes.

Figure 3:
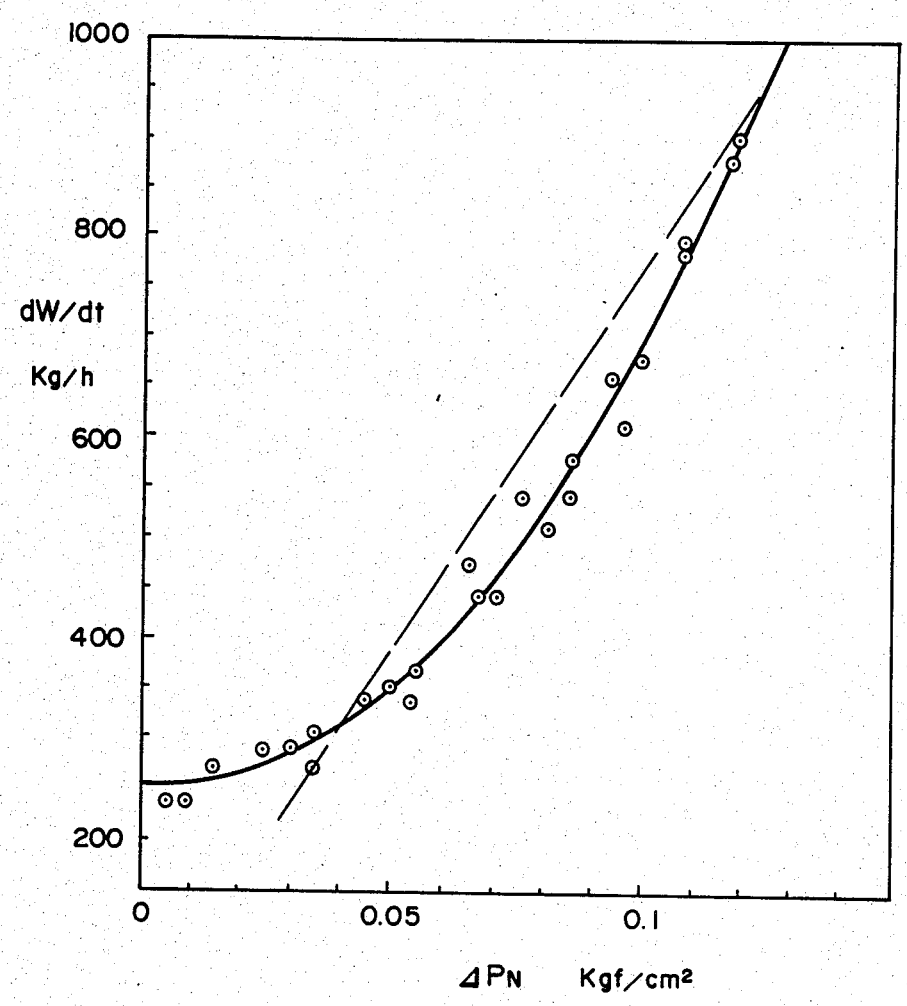
FIG. 3 is a graph showing the content of the computation performed by another computing unit employed in the embodiment shown in FIG. 1.

The content of the computation performed by each of the computing units 44A,44B and 44C is shown in FIG. 3, in which the axis of ordinate represents the material transportation rate dw/dt while the axis of abscissa represents the pressure differential $\Delta P_N$ across the discharge nozzle. The content of this computation is expressed by the following formula.

$$dw/dt = F\Delta P_N^2 + G \qquad (2)$$

where, F and G represent positive constants.

Thus, each pressure differential computing unit performs the computation in accordance with the formula (1), upon receipt of the predetermined signal from corresponding material flow rate setting device, thereby to determine and set the optimum pressure differential across the discharge nozzle. On the other hand, pressure detectors 22A,22B and 22C are connected to the portions of the booster gas supplying pipes 18A,18B and 18C near the connections to respective transportation pipes. The outputs from these pressure detectors are delivered to pressure differential computing units 23A,23B and 23C which receive also the tank internal pressure signal from the pressure detector 7 for detecting the pressure in the pressurizing tank 1. Upon receipt of these pressure signals, each pressure differential computing unit computes the actual pressure differential across the discharge nozzle. The output signals from the pressure differential computing units are delivered to respective discharge nozzle pressure differential controllers 46A,46B and 46C which receive also the signals from the pressure differential computing units 44A,44B and 44C mentioned before, respectively. The pressure differential controllers then produce and output set values of the pressure differentials across respective discharge nozzles, and deliver the same to the booster gas flow rate controllers 48A,48B and 48C which in turn produce signals for controlling the flow rate control valves 19A,19B and 19C in respective booster gas supply pipes. Consequently, the rates of supply of the booster gas to each transportation pipe are optimized to realize the distribution and transportation of the powdered or granular material to respective feeding ends at desired rates.

In the decribed embodiment, the output from the pressure differential controller, which receives the actual pressure differential signal as a measured valve, is used as the set value for the booster gas flow rate controller 48. This arrangement, however, is not exclusive and the set value of the booster gas flow rate controller 48 may be calculated from the flow rate of the powdered or granular material. Namely, it is possible to adopt such an arrangement as having, as shown in FIG. 1, a correlation flow meter 50 disposed at the downstream side of the shut-off valve 17 in each transportation pipe 4 to detect the actual transportation rate of the powdered or granular material, the output from the flow meter 50 being delivered as the measured value to the controller 46 which in turn determines the set value in the booster gas flow rate controller 48.

In this case, the controller 46 serves as a material transportation rate controller. The controllers 46A, 46B and 46C are connected selectively to the correlation flow meters 50 or to the pressure differential computing units 23A, 23B and 23C through change-over switches 52. It will be clear to those skilled in the art that, although the correlation flow meter 50 and the change-over switch 52 are shown only in connection with the transportation pipe 4A, other transportation pipes 4B and 4C have similar correlation flow meters 50 and change-over switches 52 could be added. It is possible to use a two-staged venturi in place of the correlation flow meter as the means for detecting the actual material transportation rate.

As will be understood from the foregoing description, according to the invention, it is possible to distribute and transport the powdered or granular material accurately to the feeding ends even when the terminal pressures are changed at their feeding ends. It is also possible to vary the rate or rates of transportation of the powdered or granular material to one or more feeding ends when there is a demand for variation in the material transportation rate or rates to such feeding end or ends.

Although the invention has been described through specific terms, it is to be noted here that various changes and modifications may be imparted thereto without departing from the scope of the invention which is limited solely by the appended claims.

What is claimed is:

1. In a system having a pressurizing tank for pressurizing and fluidizing a powdered or granular material, a plurality of transportation pipes having one ends constituting discharge nozzles opening above a fluidized bed in said tank and the other ends connected to different feeding ends so as to introduce said material to said feeding ends, and a plurality of booster gas supply pipes for supplying respective transportation pipes with a booster gas, a method of directly distributing and transporting said material to said feeding ends comprising the steps of:

determining a set value of an internal pressure of the pressurizing tank in accordance with a mean value of terminal pressures at said feeding ends, a mean value of predetermined set flow rates of said booster gas in said booster gas supplying pipes and a mean value of predetermined set flow rates of said material to said feeding ends, and providing a signal representing said set value of the internal pressure;

detecting an actual internal pressure of the pressurizing tank and providing a signal representing said actual internal pressure;

comparing said signal representing said set value of the internal pressure with said signal representing said actual internal pressure and providing a control signal; and controlling the internal pressure of the pressurizing tank in accordance with said control signal.

2. A method of distributing and transporting powdered or granular material according to claim 1, wherein the set value of the internal pressure of said pressurizing tank is determined in accordance with the following formula:

$$\frac{\widetilde{dw}}{dt} = -A\widetilde{Q}_B{}^2 + B\widetilde{Q}_B + CP_1 + D(P_1 - \widetilde{P}_2) + E$$

where, $P_2$ represents the mean value of the terminal pressures at said feeding ends, $Q_B$ represents the mean value of the predetermined set flow rates of said booster gas to said transportation pipes, $dw/dt$ represents the mean value of the predetermined set rates of transportation of said material to said feeding ends, and A, B, C, D and E represent positive constants.

3. In a system having a pressurizing tank having a weighing device and adapted for pressurizing and fluidizing a powdered or granular material, a plurality of transportation pipes having one ends constituting discharge nozzles opening above a fluidized bed in said tank and the other ends connected to differenet feeding ends so as to introduce said material to said feeding ends, and a plurality of booster gas supply pipes for supplying respective transportation pipes with a booster gas, a method of directly distributing and transporting said material to said feeding terminals comprising the step of:

calculating the sum of predetermined set flow rates of said material to said feeding ends, and providing a signal representing said sum as a set value;

calculating actual discharging rate of said material from said pressurizing tank through calculating a rate of change of weight of said pressurizing tank by said weighing device, and providing a signal representing the actual discharging rate;

comparing said signal representing said sum with said signal representing the actual discharging rate and providing a comparison signal;

determining a set value of an internal pressure of the pressurizing tank in accordance with said comparison signal and providing a signal representing said set value of the internal pressure;

detecting an actual internal pressure of the pressurizing tank and providing a signal representing said actual internal pressure;

comparing said signal representing said set value of the internal pressure with said signal representing said actual internal pressure and providing a control signal; and controlling the internal pressure of the pressurizing tank in accordance with said control signal.

4. In a system having a pressurizing tank provided with a weighing device and adapted for pressurizing and fluidizing a powdered or granular material, a plurality of transportation pipes having one ends constituting discharge nozzles opening above a fluidized bed in said tank and the other ends connected to different feeding ends so as to introduce said material to said feeding ends, and a plurality of booster gas supply pipes for supplying respective transportation pipes with a booster gas, a method for directly distributing and transporting said material to said feeding ends comprising the steps of:

determining set values of pressure differentials across said discharge nozzles of said transportation pipes in accordance with predetermined set flow rates of said material to said feeding ends;

delivering signals representing said set values of said pressure differentials to pressure differential controllers together with signals representing actually measured pressure differentials across said discharge nozzles;

determining, in accordance with output signals from said pressure differential controllers, set values for booster gas flow rate controllers for controlling flow rates of said booster gas to the respective transportation pipes; and controlling a discharging rate of the material in each of the transportation pipes by individually controlling a flow rate of said booster gas in accordance with each of said set values.

5. A method of distributing and transporting powdered or granular material according to claim 4, wherein the set value $\Delta P_N$ of pressure differential across each said discharge nozzle is determined in accordance with the following formula:

$$dw/dt = F\Delta P_N^2 + G$$

where, dw/dt represents the predetermined set flow rate of said material to corresponding feeding ends, while F and G represent positive constants.

6. In a system having a pressurizing tank provided with a weighing device and adapted for pressurizing and fluidizing a powdered or granular material, a plurality of transportation pipes having one ends constituting discharge nozzles opening above a fluidized bed in said tank and the other ends connected to different feeding ends so as to introduce said material to said feeding ends, and a plurality of booster gas supply pipes for supplying respective transportation pipes with a booster gas, a method of directly distributing and transporting said material to said feeding ends comprising the steps of:

determining a first set value of an internal pressure of said pressurizing tank in accordance with a mean value of the terminal pressures at said feeding ends, a mean value of predetermined set flow rates of said booster gas in said booster gas supplying pipes, and a mean value of predetermined set flow rates of said material to said feeding ends;

calculating a sum of the predetermined set flow rates of said material to said feeding ends, and providing a signal representing said sum;

calculating actual discharging rate of said material from said pressurizing tank through calculating a rate of change of weight of said pressurizing tank by said weighing device, and providing a signal representing the actual discharging rate;

determining a second set value of the internal pressure of said tank in accordance with a comparison signal being provided by comparing said signal representing said sum of the predetermined set flow rates of the material with said signal representing the actual discharging rate of said material;

correcting said first set value of the internal pressure of said pressurizing tank in accordance with said second set value and determing a corrected set value;

detecting an actual internal pressure of the pressurizing tank and providing a signal representing said actual internal pressure;

controlling the internal pressure of the pressurizing tank in accordance with a control signal being provided by comparing said corrected set value and said actual internal pressure;

determining set values of pressure differentials across said discharging nozzles of said transportation pipes in accordance with said predetermined set flow rates of said material to the respective feeding ends;

delivering signals representing said set values of said pressure differentials to pressure differential controllers together with signals representing actually measured pressure differentials across said respective discharge nozzles;

determining, in accordance with output signals from said pressure differential controllers, set values for booster gas flow rate controllers for controlling flow rates of said booster gas to the respective transportation pipes; and controlling a discharging rate of the material in each of the transportation pipes by individually controlling a flow rate of said booster gas in accordance with each of said booster gas flow rate controllers.

7. A method of distributing and transporting powdered or granular material according to claim 4, wherein the set values for said booster gas flow rate controller are determined in accordance with output signals selectively delivered from said pressure differential controllers and material transportation rate controllers which receive a signal representing actually measured flow rate of said material.

8. A method of distributing and transporting powdered or granular material according to claim 6, wherein the set values for said booster gas flow rate controller are determined in accordance with output signals selectively delivered from said pressure differential controllers and material transportation rate controllers which receive a signal representing actually measured flow rate of said material.

* * * * *